US012759351B2

(12) United States Patent
Slavin et al.

(10) Patent No.: US 12,759,351 B2
(45) Date of Patent: Oct. 13, 2026

(54) VEHICLE WHEEL IMBALANCE DETECTION

(71) Applicant: Ford Global Technologies, LLC, Dearborn, MI (US)

(72) Inventors: Daniel Francis Slavin, Oxford, MI (US); John Eric Rollinger, Troy, MI (US); Hassene Jammoussi, Canton, MI (US); Michael Goebelbecker, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 18/732,728

(22) Filed: Jun. 4, 2024

(65) Prior Publication Data

US 2025/0367988 A1 Dec. 4, 2025

(51) Int. Cl.
*B60C 23/06* (2006.01)
*G01M 1/28* (2006.01)

(52) U.S. Cl.
CPC ............. *B60C 23/065* (2013.01); *G01M 1/28* (2013.01)

(58) Field of Classification Search
CPC ....... B60C 23/065; B60C 23/062; G01M 1/28
See application file for complete search history.

(56) References Cited

U.S. PATENT DOCUMENTS

| | | | | |
|---|---|---|---|---|
| 8,047,061 | B2 | 11/2011 | Shin et al. | |
| 10,417,837 | B2 | 9/2019 | Stanek et al. | |
| 10,801,910 | B2 | 10/2020 | Raad et al. | |
| 10,830,908 | B2 | 11/2020 | Siegel et al. | |
| 2004/0024520 | A1* | 2/2004 | Oblizajek | B60G 17/00 340/440 |
| 2010/0288030 | A1* | 11/2010 | Shin | G01M 1/28 73/66 |
| 2019/0064027 | A1 | 2/2019 | Leone et al. | |
| 2019/0092106 | A1 | 3/2019 | Abdossalami et al. | |
| 2019/0144006 | A1* | 5/2019 | Hattab | B60W 40/10 701/36 |

FOREIGN PATENT DOCUMENTS

| | | | |
|---|---|---|---|
| JP | 2022541241 | A | 9/2022 |

* cited by examiner

*Primary Examiner* — Timothy P Graves
(74) *Attorney, Agent, or Firm* — Lorne Forsythe; Brooks Kushman P.C.

(57) ABSTRACT

A system includes a computer including a processor and memory, the memory storing instructions executable by the processor. The instructions include instructions to detect body vibration of a vehicle body over time and to calculate wheel vibration of each wheel of the vehicle over time. In response to detection of body vibration under a first body vibration threshold, the computer calculates a baseline wheel vibration value for each wheel based on the calculated wheel vibration for each wheel, respectively. In response to detection of body vibration above a second body vibration threshold, the computer compares the calculated wheel vibration for each wheel with the baseline wheel vibration value of each wheels, respectively. The computer identifies a wheel imbalance in one of the wheels when a difference between the wheel vibration of the wheel and the baseline wheel vibration value of the wheel exceeds a wheel vibration threshold.

19 Claims, 7 Drawing Sheets

VEHICLE WHEEL IMBALANCE DETECTION

BACKGROUND

Vehicles typically include a plurality of wheels. Over time, the wheels may become imbalanced, i.e., the weight distribution of one of the wheels is uneven about the circumference of the wheel. Imbalanced wheels may cause vibrations and/or tire wear. However, separation of vibration from an imbalanced wheel from road vibrations and identification of which one or more of the wheels is imbalanced can be difficult. It is also difficult to distinguish between persistent vibration from an imbalanced wheel and transient vibration from external sources, e.g., a temporarily flat spotted tire, snow or other debris on the tire, etc. Further, if a vehicle is operated autonomously, i.e., a human occupant is not present or is not monitoring vehicle operation, the human occupant is not as likely to perceive conventional symptoms of a wheel imbalance, e.g., vehicle vibrations or steering wheel nibble, which could result in additional wear on the vehicle and tires. Vibrations may also be perceived as poor vehicle quality.

DETAILED DESCRIPTION

Figure 1:
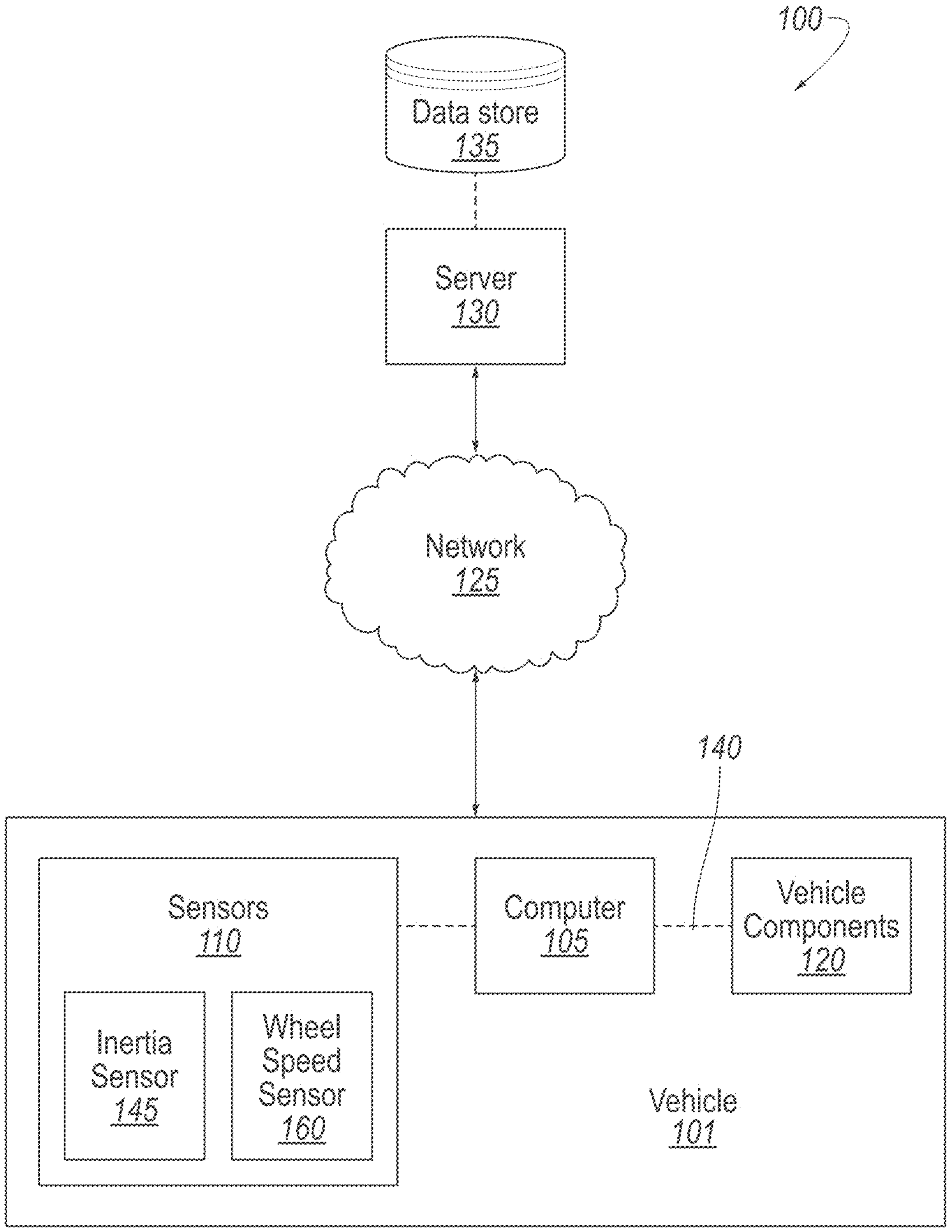
FIG. 1 is a block diagram of an example system.

A system includes a computer including a processor and memory. The memory stores instructions executable by the processor to: detect body vibration of a vehicle body over time; calculate wheel vibration of each wheel of the vehicle over time; in response to detection of body vibration under a first body vibration threshold, calculate a baseline wheel vibration value for each wheel based on the calculated wheel vibration for each wheel, respectively; in response to detection of body vibration above a second body vibration threshold, compare the calculated wheel vibration for each wheel with the baseline wheel vibration value of each wheels, respectively; and identify a wheel imbalance in one of the wheels when a difference between the wheel vibration of the wheel and the baseline wheel vibration value of the wheel exceeds a wheel vibration threshold.

The instructions to detect body vibration may include instructions to detect acceleration of the vehicle body and to determine a first order vibration of the vehicle body based on the detected acceleration. The instructions may include instructions to apply a tuned filter to the detected body vibration to identify the first order vibration of the vehicle body. The instructions may include instructions to tune the filter based on detected wheel speed of the wheels.

The instructions to detect body vibration may include instructions to identify a plurality of peaks in the detected acceleration of the vehicle body.

The instructions may include instructions to apply a tuned filter to the detected body vibration to filter at least one of road noise and vibrations from road variation.

The instructions to detect body vibration may include instructions to determine the total vibration by calculating the root-mean-square of acceleration measurements of the vehicle body in three axes. The instructions may include instructions to detect acceleration of the vehicle body in three axes and apply a tuned filter to the detected acceleration in three axes to identify the acceleration measurements of the vehicle body in three axes.

The second body vibration threshold may be empirically calculated.

The instructions to detect vibration of the body of the vehicle may include instructions to determine that the vehicle is traveling within a predetermined speed range.

A method includes: detecting body vibration of a vehicle body over time; calculating wheel vibration of each wheel of the vehicle over time; in response to detection of body vibration under a first body vibration threshold, calculating a baseline wheel vibration value for each wheel based on the calculated wheel vibration for each wheel, respectively; in response to detection of body vibration above a second body vibration threshold, comparing the calculated wheel vibration for each wheel with the baseline wheel vibration value of each wheels, respectively; and identifying a wheel imbalance in one of the wheels in response to calculation of a difference between the wheel vibration of the wheel and the baseline wheel vibration value of the wheel exceeding a wheel vibration threshold.

Detecting body vibration may include detecting acceleration of the vehicle body and determining a first order vibration of the vehicle body based on the detected acceleration. The method may include applying a tuned filter to the detected body vibration to identify the first order vibration of the vehicle body. The method may include tuning the filter based on detected wheel speed of the wheels.

Detecting body vibration may include identifying a plurality of peaks in the detected acceleration of the vehicle body.

The method may include applying a tuned filter to the detected body vibration to filter at least one of road noise and vibrations from road variation.

The method may include detecting body vibration includes determining the total vibration by calculating the root-mean-square of acceleration measurements of the vehicle body in three axes. The method may include detecting acceleration of the vehicle body in three axes and applying a tuned filter to the detected acceleration in three axes to identify the acceleration measurements of the vehicle body in three axes.

Detecting vibration of the body of the vehicle includes determining that the vehicle is traveling within a predetermined speed range.

With reference to the Figures, wherein like numerals indicate like parts throughout the several views, a system includes a computer including a processor and memory. The memory storing instructions executable by the processor. The system detects body vibration of a vehicle body over time and calculates a wheel vibration of each wheel of the vehicle over time. In response to detection of body vibration under a first body vibration threshold, the system calculates a baseline wheel vibration value for each wheel based on the calculated wheel vibration for each wheel, respectively. In response to detection of body vibration above a second body vibration threshold, the system compares the calculated wheel vibration for each wheel with the baseline wheel vibration value of each of the wheels, respectively. The system identifies a wheel imbalance in one of the wheels when a difference between the wheel vibration of the wheel and the baseline wheel vibration value of the wheel exceeds a wheel vibration threshold.

By detecting body vibration, the system can identify whether body vibration is at a level that is felt by an occupant of the vehicle. If the vibration of the vehicle body is below the second body vibration threshold, e.g., a level of vibration that is not felt by an occupant, the system does not search for a wheel imbalance and instead calculates a baseline wheel vibration value for each wheel. If the vibration of the body is such that the vibration is above the second body vibration threshold, e.g., a level felt by an occupant of the vehicle such as through a floor of the vehicle, through a seat, through a steering wheel, etc., the system identifies which one or more of the wheels is imbalanced. When identifying wheel imbalance, the system compares the vibration at each wheel with the baseline wheel vibration value for each wheel, respectively, that was calculated when the vibration of the vehicle body was below the second body vibration threshold. In other words, the calculation of the baseline wheel vibration value is limited to the condition that the vibration of the vehicle body is relatively low, e.g., at a level not felt by the occupant. This accommodates for variation in baseline levels of variation in a wheel-to-wheel and thus reduces false positives in identification of wheel vibration due to such variation.

FIG. 1 illustrates an example system 100 for detecting wheel vibration generated by wheels of a vehicle 101. A computer 105 in the vehicle 101 is programmed to receive collected data from one or more sensors 110. For example, vehicle data may include a location of the vehicle 101, data about an environment around a vehicle, data about an object outside the vehicle such as another vehicle, etc. A vehicle location is typically provided in a conventional form, e.g., geo-coordinates such as latitude and longitude coordinates obtained via a navigation system that uses the Global Positioning System (GPS). Further examples of data can include measurements of vehicle systems and components, e.g., a vehicle velocity, a vehicle trajectory, etc.

The computer 105 is generally programmed for communications on a vehicle network 140, e.g., including a conventional vehicle communications bus. Via the network, bus, and/or other wired or wireless mechanisms (e.g., a wired or wireless local area network in the vehicle 101), the computer 105 may transmit instructions and/or data to various devices in the vehicle 101 and/or receive messages from the various devices, e.g., controllers, actuators, sensors, etc., including sensors 110. Alternatively or additionally, in cases where the computer 105 includes multiple devices, the vehicle network 140 may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

Sensors 110 can include a variety of devices. For example, various controllers in a vehicle 101 may operate as sensors 110 to provide data via the vehicle network 140, e.g., data relating to wheel speed, vehicle speed, acceleration, position, subsystem and/or component status, etc. Further, other sensors 110 could include cameras, motion detectors, etc., i.e., sensors 110 to provide data for evaluating a position of a component, evaluating a slope of a roadway, etc. The sensors 110 could, without limitation, also include short range radar, long range radar, LIDAR, and/or ultrasonic transducers. Collected data can include a variety of data collected in a vehicle 101. Examples of collected data are provided above, and moreover, data are generally collected using one or more sensors 110, and may additionally include data calculated therefrom in the computer 105, and/or at the server 130. In general, collected data may include any data that may be gathered by the sensors 110 and/or computed from such data.

The sensors 110 may include an inertia sensor 145, e.g., an inertial measurement unit (IMU), that measures acceleration of a body of the vehicle 101, hereinafter referred to as vehicle body 165, and outputs measurement of acceleration, orientation, etc., of the vehicle body 165. The inertia sensor 145 is mounted to the vehicle body 165, including in conventionally known ways and locations.

The sensors 110 may include wheel speed sensors 160. The vehicle 101 may include a wheel speed sensor 160 for each wheel 155, i.e., four wheel speed sensors 160. The wheel speed sensor 160 detects rotation of the respective wheel 155 and outputs measurement of a rotational speed of that wheel 155.

The vehicle 101 can include a plurality of vehicle components 120. In this context, each vehicle component 120 includes one or more hardware components adapted to perform a mechanical function or operation, such as moving the vehicle 101, slowing or stopping the vehicle 101, steering the vehicle 101, etc. Non-limiting examples of components 120 include a propulsion component (e.g., an internal combustion engine and/or an electric motor, etc.), a transmission component, a steering component (e.g., that may include one or more of a steering wheel, a steering rack, etc.), a brake component, and the like. In some examples, the computer 105 may operate components 120 of the vehicle 101 autonomously or semi-autonomously.

The system 100 can include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
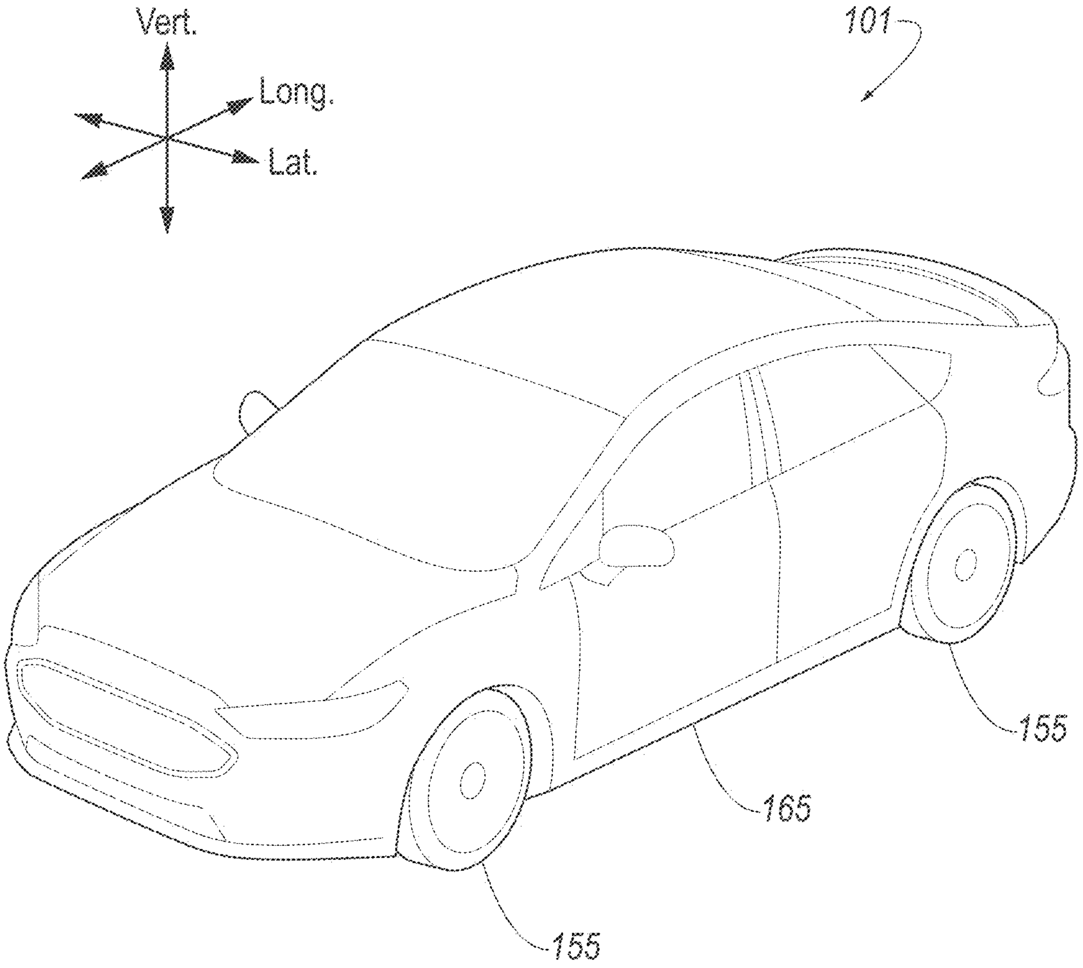
FIG. 2 is a perspective view of a vehicle.

FIG. 2 illustrates an example vehicle 101. The vehicle 101 includes a plurality of wheels 155, and the example of FIG. 2 shows two of four total wheels 155. The wheels 155 support a vehicle body 165 and allow the vehicle 101 to move along a roadway or the like. Each wheel 155 may include a rim and a tire, as is known.

The computer 105 can detect a force imbalance on each wheel 155 based on detected wheel vibration of each wheel 155. As used herein, a force imbalance is defined as a nonuniform weight distribution of the wheel about the rotational axis of the wheel. The force imbalance can be caused by one of the wheels 155 having an uneven distribution of weight about a circumference of the wheel 155 and/or a tire attached to the wheel, e.g., an asymmetric (i.e., non-circular or out-of-round) wheel 155 that causes a force applied to a suspension attached to the wheel 155. For example, the weight distribution about the wheel 155 can be uneven when, e.g., one of the tires on one of the wheels 155 is out of round, one of the wheels 155 is mismounted, etc. The uneven weight distribution generates centripetal forces radially extending from the center of the wheel 155 toward an unevenly weighted portion of the wheel 155. Because the suspension of the vehicle 101 is connected to the center of the wheel 155, the centripetal forces pull on the suspension as the wheel 155 rotates, generating a vibration as the unevenly weighted portion of the wheel 155 rotates about the circumference of the wheel 155. That is, the unevenly weighted portion of the wheel 155 can cause the wheel 155 to rise and fall relative to the suspension, causing the suspension to rise and fall. The rising and falling of the suspension results in a vibration that is proportional to the rotating speed of the wheel 155, i.e., the wheel speed. The suspension can absorb a portion of the vibration, and the remaining vibration can be transmitted to other vehicle components 120, e.g., a floor of the vehicle 101, a steering wheel, a seat, etc. The uneven weight distribution can cause the wheel 155 to rotate at differing speeds, e.g., speeding up and slowing down during each rotation of the wheel 155, which can cause wear on a tire.

A wheel 155 is “imbalanced” when the wheel 155 has a physical characteristic, e.g., tires are out of round, the tires are mis-mounted, the tires are degraded, etc., resulting in the wheel 155 generating a centripetal force absorbed by the suspension during each revolution of the wheel 155. Replacement of an imbalanced wheel can resolve the force imbalance. When one of the wheels 155 is imbalanced, one or more components 120 may require repair or replacement, e.g., a tire may require replacement and/or alignment, a rim may require repair, the wheel 155 may require rebalancing, etc. The wheel imbalance can cause tire wear and can cause vibration in other vehicle components 120, e.g., a floor of the vehicle 101, a steering wheel, a seat, etc. For example, a wheel 155 can be imbalanced when, e.g., the vehicle 101 is exposed to temperature variations (e.g., sitting in the sun) that cause material deformation in the tire, creating flat spots in the tire and/or permanently distorting the tire. In another example, a wheel 155 can be imbalanced upon striking an uneven portion of a roadway (e.g., a pothole) that bends the rim of the wheel 155 out of round.

The computer 105 can identify a specific wheel 155 that is imbalanced, and that requires service, based on first order vibration of the vehicle body and wheel speed data from each wheel. The computer 105 receives body acceleration data from the inertia sensor 145 indicating the acceleration of the vehicle body 165 in three axes (e.g., vehicle lateral axis, vehicle longitudinal axis, and vertical axis as identified in FIG. 2) over time. A tuned filter, described below as a “second tuned filter”, is applied to the data for acceleration of the vehicle body 165 taken on each of these three axes to identify first order vibration of the vehicle body 165 in the three axes. The first order vibration is the type of vibration input to the vehicle body 165 from the wheels 155. This filtered data for acceleration of the vehicle body 165 in the three axes are then combined, e.g., using a root-square-means calculation, to determine a total body vibration over time. The total body vibration may be used to identify a total body vibration magnitude over time, e.g., with peak-to-peak analysis as described below. The total body vibration magnitude is then compared to at least one body vibration threshold. For example, in the event the total body vibration magnitude is below a first body vibration threshold, the computer 105 uses wheel speed data from each wheel 155 during that time to calculate a baseline for the vibration of each wheel 155, i.e., the baseline wheel vibration value for each wheel. In the even the total body vibration magnitude is above a second body vibration threshold, the computer 105 identifies whether one or more of the wheels 155 has an imbalance exceeding a wheel vibration threshold during that time that caused the total body vibration magnitude to exceed the second body vibration threshold. In other words, the computer 105 collects data indicating the total body vibration magnitude over time and can identify input from a specific wheel 155 at a specific time that causes the total body vibration magnitude to exceed the second body vibration threshold at that specific time. The computer 105 identifies whether one or more of the wheels 155 has a wheel vibration exceeding a wheel vibration threshold by comparing detected wheel vibration data, e.g., based on wheel speed measured at each wheel, with the baseline wheel vibration value for each wheel 155, respectively. If the difference between the detected wheel vibration and the baseline wheel vibration value exceeds a wheel vibration threshold for any wheel 155, then computer 105 identifies that wheel 155 as having a wheel imbalance and a fault is counted. In the event that counted faults for a wheel 155 exceeds a predetermined number over a predetermined time period or traveled distance, the computer 105 sends a notification over the network 125 to a user device (e.g., a smartphone, a tablet, etc.) and/or to the server 130 and/or to a computer at a repair location indicating that the wheel 155 is imbalanced.

Figure 3A:
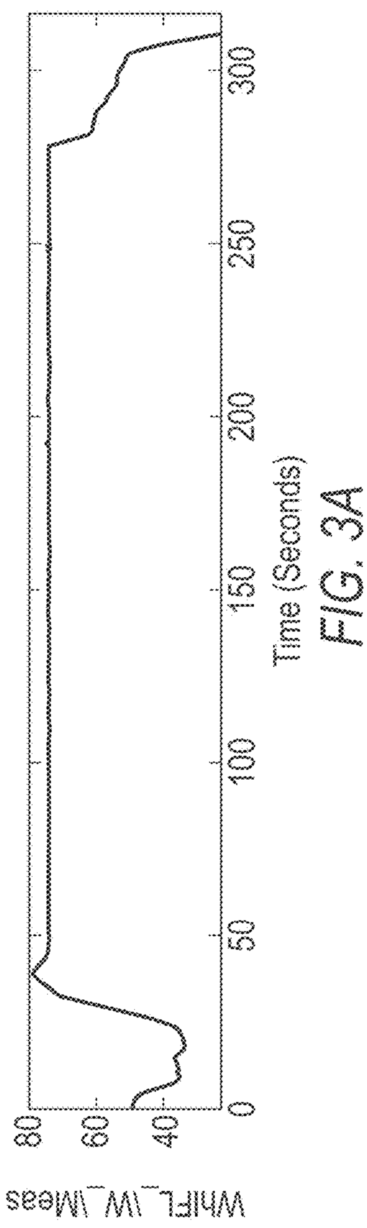
FIG. 3A is a graph of wheel speed for one wheel of the vehicle.
Figure 3B:
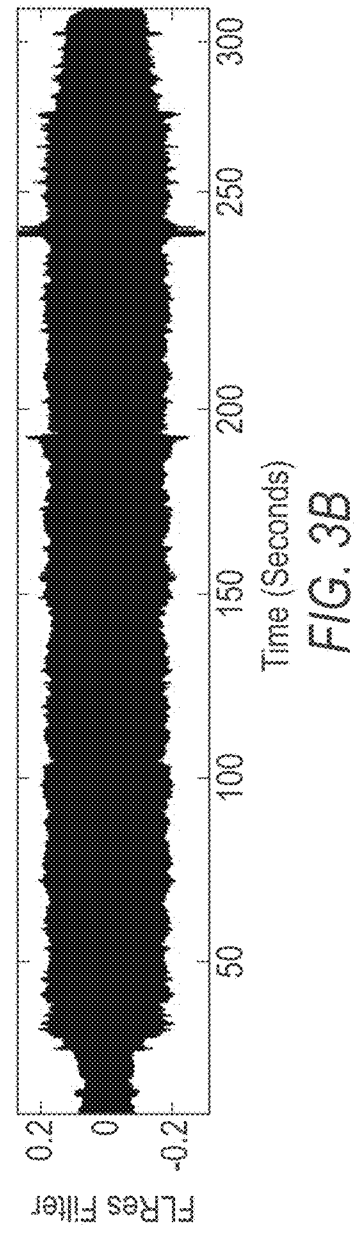
FIG. 3B is a graph of the output of a tuned filter showing first order vibration of a vehicle body of the vehicle.
Figure 3C:
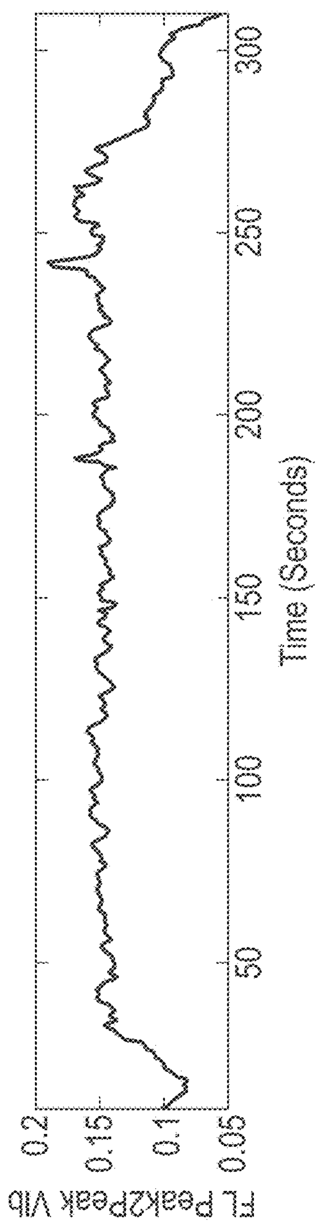
FIG. 3C is a graph of the total body vibration magnitude.

FIGS. 3A-3C show example data collected and processed by the computer 105 for one of the wheels 155. The data is collected and processed by the computer 105 separately for each of the wheels 155, and FIGS. 3A-C shows the data for one of the wheels 155. FIGS. 3A-3C are hypothetical representations of data for the sake of illustrating the example computer 105 and processes 600, 700 described herein.

FIG. 3A shows a diagram of example wheel speed data. The wheel speed data is collected by the wheel speed sensors 160 and includes wheel speed over time, including changes in wheel speed over time. FIG. 3A shows a graph of the wheel speed data, for one of the wheels 155. The diagram of FIG. 3A has a horizontal axis showing time in seconds(s) from initiation of data collection. The diagram of FIG. 3A has a vertical axis showing the speed of the wheel 155 in radians per second (rad/s). The wheel speed data may be collected from the wheel speed sensors for each wheel 155 and the wheel speed sensors 155 can communicate the wheel speed data to the computer 105 through the vehicle network 140. The wheel speed data shown in FIG. 3A is collected for each individual wheel and, as set forth above, the diagram shown in FIG. 3A is an illustration of the data for one of the wheels 155.

FIG. 3B shows a diagram of the output of body acceleration data measured by the inertia sensor 145 after being filtered by the tuned filter described further below. The tuned filter is tuned for the wheel speeds of the wheels 155, as described below. The vertical axis of FIG. 3B is measured in radians/second and the horizontal axis of FIG. 3B is measured in seconds and is aligned with the time on the horizontal axis of FIG. 3A. It should be appreciated that the line shown in FIG. 3B is sinusoidal and the sinusoidal pattern is dense in FIG. 3B.

FIG. 3C shows a diagram of the total body vibration magnitude based on the filtered data in FIG. 3B. As described below, the total body vibration magnitude may be determined using peak-to-peak analysis of the data in FIG. 3B. The vertical axis of FIG. 3C is measured in radians/second and the horizontal axis of FIG. 3C is measured in seconds and is aligned with the time on the horizontal axis of FIGS. 3A and 3B.

Figure 4:
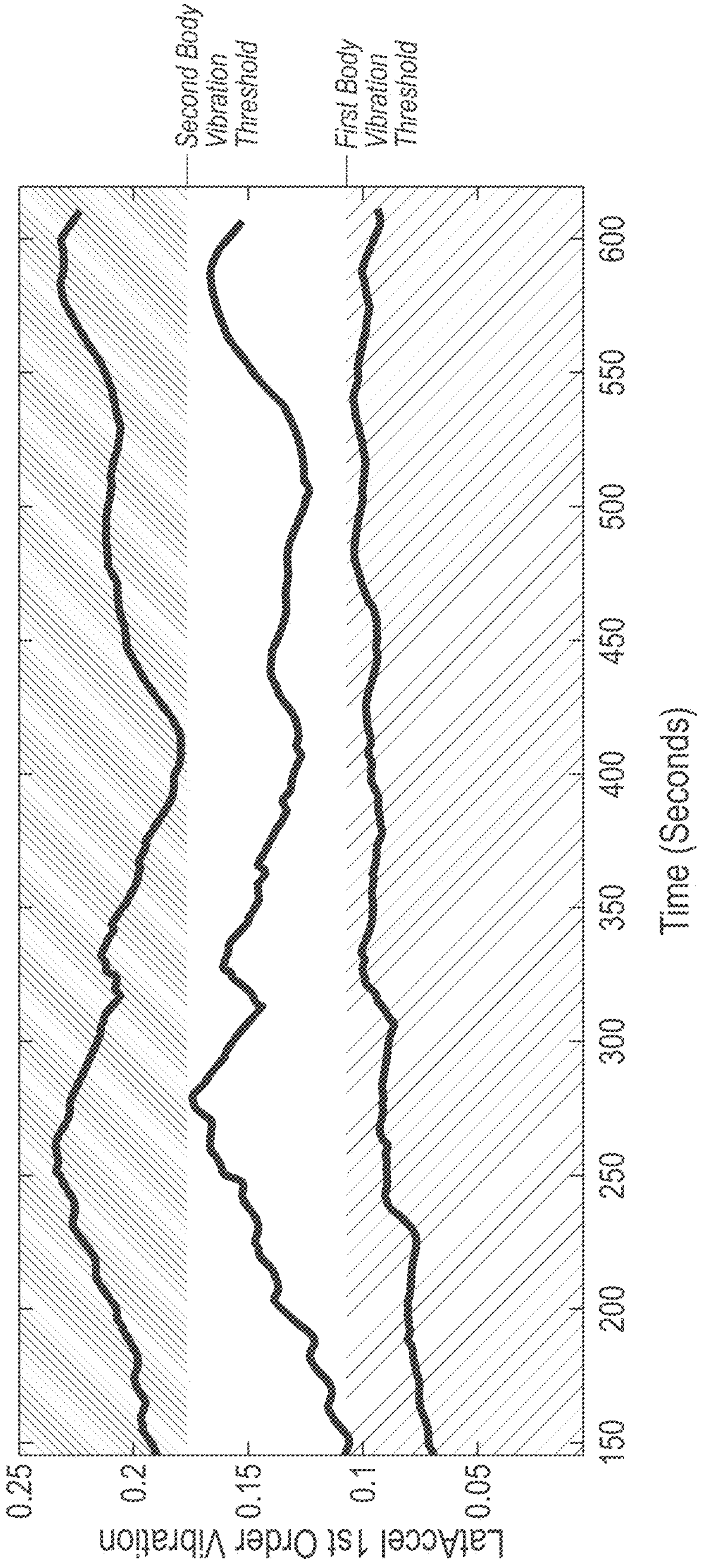
FIG. 4 is a graph showing three examples of curves for total body vibration magnitude.

FIG. 4 shows a diagram of three examples of total body vibration magnitude in comparison to the first body vibration threshold and the second body vibration threshold. The lines in FIG. 4 are hypothetical representations of data for the sake of illustrating the example computer 105 and processes 600, 700 described herein.

With continued reference to FIG. 4, the bottom line shows an example in which the total body vibration magnitude is below the first body vibration threshold. When the total body vibration magnitude is below the first body vibration threshold, the computer 105 calculates the baseline wheel vibration value for each wheel 155 based on wheel speed data measured by the wheel speed sensor 160 for each wheel 155, respectively. The top line shows an example in which the total body vibration magnitude is above the second body vibration threshold. When the total body vibration magnitude is above the second body vibration threshold, the computer 105 compares the wheel speed data measured by the wheel speed sensor 160 for each wheel 155, respectively, to the respective baseline wheel vibration value for each wheel 155 to identify a wheel vibration in any one or more of the wheels 155. In the example shown in FIG. 4, the middle line is in an intermediate zone between the first body vibration threshold and the second body vibration threshold, in which case the computer 105 neither calculates baseline wheel vibration values nor seeks to identify a wheel vibration in the wheels 155. The first body vibration threshold and the second body vibration threshold may be empirically calculated, and the empirical calculation may be, for example, based on wheel design and suspension design. In the example shown in FIG. 4, the first body vibration threshold and the second body vibration threshold are different values such that the intermediate zone is therebetween. In other examples, the first body vibration threshold and the second body vibration threshold may be the same such that there is no intermediate zone therebetween.

Figure 5A:
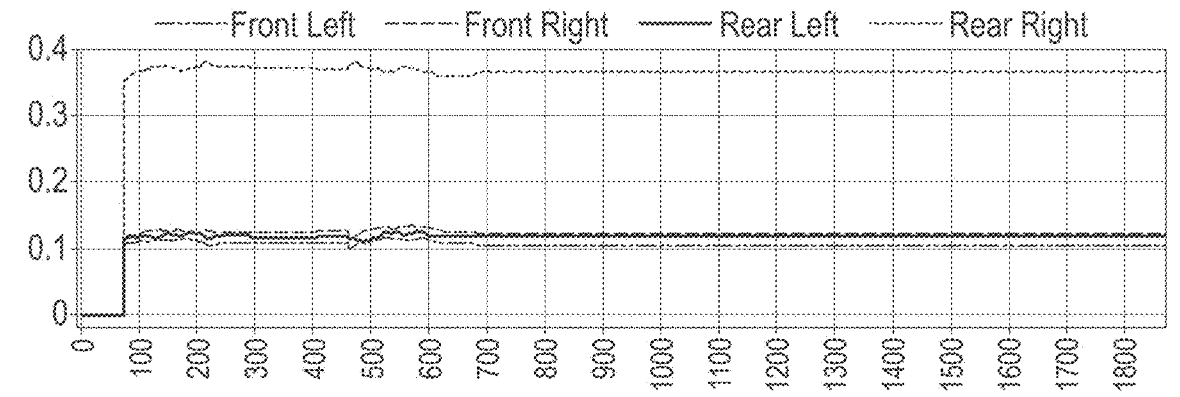
FIG. 5A is a graph showing wheel vibration data for four wheels.
Figure 5B:
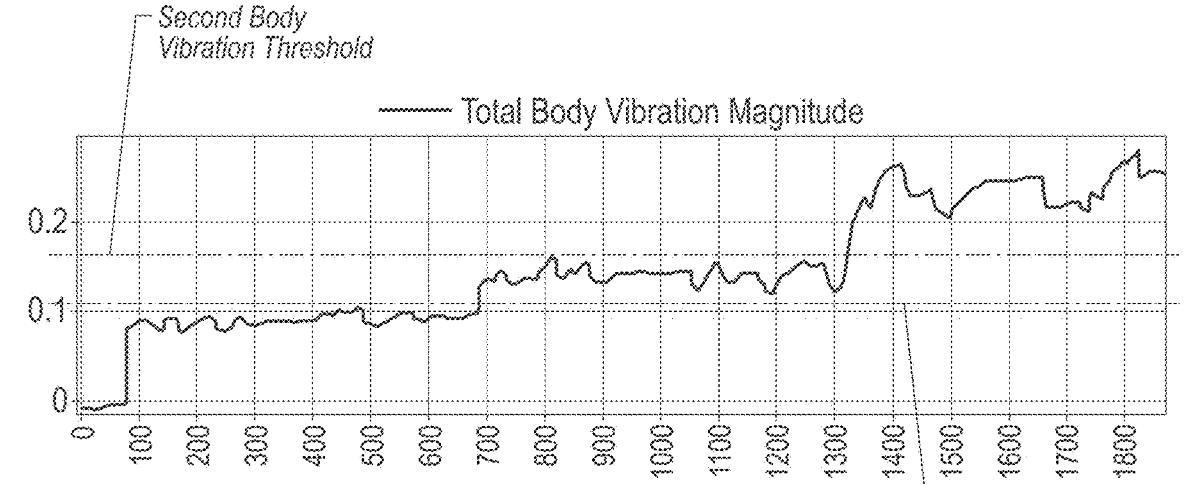
FIG. 5B is a graph showing the total body vibration magnitude.
Figure 5C:
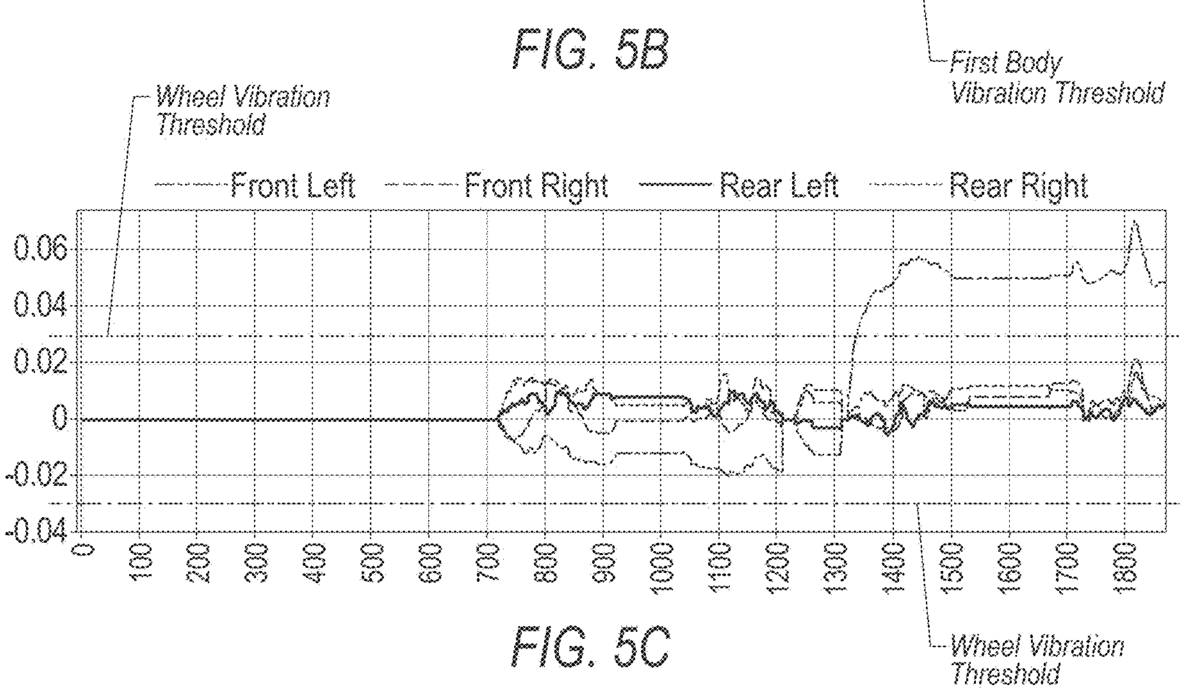
FIG. 5C is a graph showing the difference between the wheel vibration data and a baseline wheel vibration value.

FIGS. 5A-5C shows example data collected and processed by the computer 105. FIGS. 5A-5C are hypothetical representations of data for the sake of illustrating the example computer 105 and processes 600, 700 described herein. FIG. 5A shows vehicle wheel vibration data over time for each of the four wheels 155. FIG. 5B shows the total vehicle vibration magnitude during the same time as FIG. 5A. FIG. 5C shows the difference between the wheel vibration data and the baseline wheel vibration value for each wheel 115 during the same time as FIGS. 5A and 5B.

With reference to FIG. 5A, the vehicle vibration data is based on wheel speed data collected for each wheel 155 by the respective wheel speed sensor 160, and the calculation of the wheel vibration data is described further below. In FIG. 5A, the vehicle vibration data is higher for one of the wheels 155 in comparison to the other three wheels 155 and, as shown in FIG. 5B, the total body vibration magnitude is below the first body vibration threshold for all four wheels 155 in the first third of the time in FIG. 5B, despite the variation in vehicle vibration data. Accordingly, during the first third of the time in FIGS. 5A-5C, the computer 105 calculates the baseline wheel vibration value. In the middle third of the time in FIGS. 5A-5C, the total body vibration magnitude is above the first body vibration threshold and below the second body vibration magnitude, thus the computer 105 neither calculates the baseline wheel vibration value nor compares the wheel vibration data of the four wheels to the baseline wheel vibration value. In the last third of the time in FIGS. 5A-C, the total body vibration magnitude exceeds the second body vibration threshold. During this time period, the computer 105 compares the wheel vibration data to the baseline wheel vibration value that was calculated in the first third of the time in FIGS. 5A-5C. If the difference between the wheel vibration data to the baseline wheel vibration value exceeds the wheel vibration threshold, a fault is identified. The wheel vibration threshold may be empirically calculated, and the empirical calculation may be, for example, based on noise/vibration/harshness specifications for the vehicle 101, wheel design, and/or suspension design. The wheel vibration threshold may be positive and negative, as shown in FIG. 5C.

The computer 105 may refrain from determining the baseline wheel vibration value and comparing the wheel speed data of the wheels to the respective wheel vibration thresholds until one or more initialization conditions ac met. As used herein, an "initialization condition" is at least one of a minimum distance traveled by the vehicle 101 after initial startup, a speed range of the vehicle 101, the vehicle 101 is traveling at a constant speed, and/or that the vehicle 101 is traveling in a straight line. The initialization conditions can be determined to reduce variations in the wheel speed data from external sources e.g., temporary flat-spotting of tires, tire warmup, curved roads, transient variations in speed, etc. The initialization conditions can be determined to prevent false positive detections of force imbalance, e.g., from flat-spotted tires and/or debris on the wheel 155. The initialization conditions increase identification that the detected force imbalance is the result of an imbalanced wheel 155, preventing unnecessary alerts to a user and/or unnecessary maintenance.

The computer 105 can refrain from beginning detection for force imbalance until specific initialization conditions are met. For example, the computer 105 can determine that detection should be when a distance condition, a speed range condition, an acceleration condition, and a straightness condition are met. Alternatively, the computer 105 can determine that detection should begin when any combination of the distance condition, the speed range condition, the straightness condition, and the acceleration condition are met, e.g., when any one of the conditions are met, when any two of the conditions are met, when the distance condition and any one of the other conditions are met, etc. The computer 105 and/or the server 130 can determine which of the conditions should be met to begin detecting the force imbalance based on, e.g., predetermined empirical testing.

The initialization conditions can include a distance condition that is a predetermined distance from a start of a route followed by the vehicle 101. The distance condition can be determined to reduce variations in the wheel speed data from, e.g., temporary tire deformities, tire warmup, etc. When the vehicle 101 begins the route, the computer 105 can actuate an odometer to determine the distance elapsed from the start of the route. For example, the predetermined distance could be 25 miles. When the distance elapsed exceeds the predetermined distance, the computer 105 can determine that the distance condition is satisfied.

The initialization conditions can include a speed range condition that is a predetermined speed range in which the vehicle 101 must remain to reduce variations in the wheel speed data 115. The speed range condition can be determined to reduce wheel speed variations from transient vehicle speed changes. Furthermore, the determined forces can vary based on vehicle speed. Collecting data when the vehicle 101 is in the speed range can increase consistency of the data collected. As an example, 65-75 mph may be a speed range of the vehicle that excites the first order vibration of the vehicle body for increased detection by the inertia sensor 145. The predetermined speed range can be determined from the empirical testing of forces from wheel 155 and tire combinations as described above. When the current vehicle 101 speed is in the predetermined speed range, the computer 105 can determine that the speed range condition is satisfied. For example, the empirical testing described above can include testing wheel and force imbalance combinations sampled at different vehicle speeds.

The initialization conditions can include a straightness condition. The straightness condition is a measure that the vehicle 101 is moving substantially straight in the roadway, reducing wheel speed variations that can result from the vehicle turning. When the vehicle 101 is not moving substantially straight in the roadway, the wheels 155 can receive additional forces, e.g., from friction with the roadway, that can dampen the wheel speed variations. Collecting wheel speed data during a turn (i.e., when the vehicle 101 is not moving substantially straight) can result in inconsistent wheel speed data. The computer 105 can determine that the vehicle 101 is moving straight when the respective wheel speeds of the front two wheels 155 differ by less than a difference threshold. That is, when one of the front wheels 155 moves faster than the other of the front wheels 155, the vehicle 101 will turn away from the faster wheel 155. The computer 105 can determine a difference between the wheel speed data from the front wheels 155. When the difference is below the difference threshold, the computer 105 can determine that the vehicle 101 is moving straight, satisfying the straightness condition.

The initialization conditions can include an acceleration condition. Because the wheel speed data 115 can be affected by acceleration and deceleration of the vehicle 101, the acceleration condition indicates that the vehicle 101 is moving at a steady speed, reducing wheel speed variations from the vehicle 101 accelerating or decelerating. The computer 105 can determine that the acceleration condition is satisfied when the acceleration of the vehicle 101 is below a predetermined acceleration threshold. The predetermined acceleration threshold can be determined based on empirical testing of forces from wheel 155 and tire combinations as described above.

The memory of the computer 105 stores instructions to calculate wheel vibration data for each wheel of the vehicle 101 over time. Wheel vibration data may be calculated for each wheel 155, respectively, i.e., four separate sets of wheel vibration data. The wheel vibration data may be based on wheel speed detected by the wheel speed sensor 160 for each wheel 155.

The computer 105 can apply a filter to the wheel speeds detected by the wheel speed sensor 160. The filter can be, e.g., a notch filter, a band-pass filter, a high-pass filter, a low-pass filter, etc. The filter can remove variations in the measured wheel speed caused by external sources, e.g., changes in road grade, changes in road condition, etc. The filtered speed data can be converted with a conventional vehicle tire conversion algorithm based on a size of the wheel 155 into a frequency measured in revolutions per second, i.e., Hertz (Hz). The frequency can be converted between radians per second (rad/s) and Hz using a unit conversion, i.e., 1 Hz=$2\pi$ rad/s. For example, the tire conversion algorithm can be a Fourier transform applied to the filtered speed data to identify a plurality of frequencies that compose the filtered speed data. The variations in the speed data can be shown as specific ranges of frequencies determined from the Fourier transform. The filter can be selected to remove the frequencies in the specific ranges from the wheel speed variations from the external sources. That is, the external sources typically introduce frequencies in known ranges, determined through empirical testing, that can be removed with the filter. For example, the wheel can vibrate at a resonant frequency, determined through empirical testing, and the filter can remove the resonant frequency from the plurality from frequencies. Thus, the computer 105 can determine the wheel speed as the remaining frequency (in Hz) of the filtered wheel speed data. Based on the remaining frequency, the computer 105 can tune the tuned resonance frequency to filter frequencies from the speed data that are not the remaining frequency corresponding to the wheel speed.

Using wheel speed data from wheel speed sensors 160, the computer 105 can apply a first tuned filter to show the specific frequency from the wheel speed data representing the wheel speed. "Tuned" in the context of the first tuned filter means a band-pass filter that reduces the amplitudes of frequencies that are not a specified frequency, e.g., a resonant frequency, a frequency corresponding to a wheel speed, the remaining frequency described above, etc. The first tuned filter captures speed variations from speed data at the specified frequency, removing variations resulting from sources external to the vehicle 101, e.g., road grade, road conditions, etc., and the wheel speed data can then show the respective wheel speed for each wheel 155. The specified frequency range for the speed variations can be determined based on the filtered wheel speed data. The adjective "first" in the first tuned filter is an identifier and does not indicate order or importance.

The computer 105 can apply the first tuned filter to the wheel speed data collected by the wheel speed sensors 160 to filter all frequencies from the wheel speed data except for the specified frequency corresponding to the wheel speed, as described above. Upon applying the first tuned filter to the wheel speed data, the remaining data represent the wheel speed data corresponding to wheel speed variations. Thus, the first tuned filter removes variations in the wheel speed data resulting from external sources, and the remaining filtered wheel speed data represents wheel speed variations from the wheel 155. A curve can be recorded showing the result of the first tuned filter applied to the wheel speed data over time for each wheel 155, i.e., four curves.

Upon determining the wheel speed variation curve, the computer 105 can determine peaks of the curve by applying a peak detection technique to the curve, e.g., applying a known peak detection technique in some examples. The computer 105 can apply a peak detection algorithm and a low-pass filter to determine an average peak magnitude of the wheel speed variations over a predetermined period of time, e.g., the period of time since initially collecting wheel speed data, represented in the curve. The computer 105 can retrieve a lookup table or the like correlating the average peak magnitude of the wheel speed variations to force values to determine a value for wheel vibration correlated to the average peak magnitude of the wheel speed. The lookup table could have two columns: one for the speed variation magnitudes, and one for the value for wheel vibration. The speed variation magnitudes can be determined based on data from empirical testing. The values for wheel vibration are determined accelerations on the suspension caused by the imbalanced wheel 155. The lookup table can be constructed by applying empirical tested forces onto specific wheel 155 and tire combinations and determining wheel speed variations resulting from those empirically tested accelerations. The resultant wheel speed variations can be used to determine a correlation between wheel speed variation magnitudes and the vibration of the wheel 155, and the correlation can be used to populate the lookup table. Thus, upon receiving the average peak magnitude of the wheel speed variations, the computer 105 can use the average peak magnitude of the wheel speed variations to obtain values for wheel vibration from the lookup table to determine a determined values for wheel vibration, collectively "wheel vibration data," for each wheel 155.

The memory of the computer 105 stores instructions to detect body vibration of the vehicle body 165 over time. Specifically, the computer receives data from the inertia sensor 145 indicating the acceleration of the vehicle body 165 in three axes (e.g., vehicle lateral axis, vehicle longitudinal axis, and vertical axis as identified in FIG. 2) over time. The data indicating acceleration of the vehicle body 165 in three directions, i.e., three sets of data, are filtered with a second tuned filter to determine a first order vibration of the vehicle body in the three axes. That filtered data is combined, e.g., using a root-square-means calculation, to determine the total body vibration over time. The total body vibration may be used to identify a total body vibration magnitude over time, e.g., with peak-to-peak analysis.

The instructions to detect body vibration of the vehicle body 165 over time include instructions to collect body vibration with the inertia sensor 155, and more specifically, to detect acceleration of the vehicle body 165 and to determine a first order vibration of the vehicle body 165 based on the detected acceleration. The inertia sensor 145 measures acceleration of the vehicle body 165 and outputs measurement of acceleration of the vehicle body 165. Specifically, the inertia sensor 145 detects acceleration in the three axes as described above, i.e., lateral acceleration, longitudinal acceleration, and vertical acceleration.

The instructions to detect body vibration of the vehicle body 165 include instructions to apply a second tuned filter to the detected acceleration in three axes to identify the acceleration measurements of the vehicle body 165 in three axes. Specifically, the computer 105 applies the second tuned filter to the body vibration detected by the inertia sensor 145 to identify the first order vibration of the vehicle body 165. This removes DC offsets and road noise from road variation to isolate vibration input to the vehicle body 165 from a wheel imbalance. The adjective "second" in the second tuned filter is an identifier and does not indicate order or importance.

"Tuned" in the context of the second tuned filter means a band-pass filter that is tuned to the vehicle speed. The input to a transfer function of the second tuned filter is vehicle speed, e.g., based on wheel speed detected by the wheel speed sensors 160. In other words, the memory stores instructions to tune the filter based on detected wheel speed of the wheels. As an example, the transfer function of the second tuned filter may be:

$$\frac{\text{Vibration Signal}}{\text{Wheel Speed}} = \frac{N_0 z^2 + N_1 z + N_2}{D_0 z^2 + D_1 z + D_2}$$

where:

$$N_0 = 1 - R$$

$$N_1 = 0$$

$$N_2 = R - 1$$

$$D_0 = 1$$

$$D_1 = -2R\cos(\theta)$$

$$D_2 = R^2$$

and where

R is the decay factor;

$\omega_n$ is the natural frequency in rad/sec; and $\theta$ is the discrete time resonance frequency, $\theta = T_s \omega_n$ In the transfer function above, $\omega_n$ is based on vehicle speed and is a variable input to the transfer function. Due to the filtering, a time lag may be present and thus a lead filter may be applied to align the output of the second tuned filter with the proper time.

As set forth above, FIG. 3B shows a diagram of the output of body acceleration data measured by the inertia sensor 145 after being filtered by the second tuned filter. As set forth above, the body acceleration data is measured in three axes. Thus, the computer 105 generates filtered data, i.e., filtered by the second tuned filter, for each of the three axes. The instructions to detect body vibration include instructions to determine the total body vibration data by calculating the root-mean-square of the acceleration measurements of the vehicle body 165 in the three axes. In other words, the total body vibration data is calculated by taking the square root of the sum of the lateral acceleration squared, the longitudinal acceleration squared, and the vertical acceleration squared. The root-mean-square of the acceleration measurements of the vehicle body 165 is the total body vibration data.

The total body vibration data over time is sinusoidal. The instructions to detect body vibration include instructions to identify a plurality of peaks in the detected acceleration of the vehicle body to identify the total body vibration magnitude. The total body vibration magnitude over time is shown in FIG. 3C. The computer 105 may apply a peak-to-peak analysis. In some examples, the peak-to-peak analysis may be of a conventional type.

During periods of relatively low vehicle body vibration, the computer 105 determines the baseline wheel vibration value for each wheel 155. The computer 105 includes instructions to, in response to detection of body vibration under the first body vibration threshold, calculate the baseline wheel vibration value for each wheel 155 based on the calculated wheel vibration for each wheel 155, respectively. Specifically, the computer 105 includes instructions to compare the total body vibration magnitude with the first body vibration threshold. If the total body vibration magnitude is below the first body vibration threshold, the computer 105 calculates the baseline wheel vibration value for each wheel 155 based on the wheel vibration data for each wheel 155 during that time. In a situation in which the total body vibration magnitude is below the first body vibration threshold for a period of time, the computer 105 continues to modify the baseline wheel vibration value over that period of time based on the wheel vibration data during that period of time. As an example, the computer 105 may calculate the baseline wheel vibration value to be a rolling average of the baseline wheel vibration values over predetermined lengths of time during which the total body vibration magnitude is below the first body vibration threshold.

During periods of relatively high vehicle body vibration, the computer 105 seeks to identify a wheel imbalance of one or more of the wheels 155. The computer 105 includes instructions to, in response to detection of body vibration above the second body vibration threshold, compare the calculated wheel vibration for each wheel 155 with the baseline wheel vibration value of each wheel 155, respectively. The computer 105 includes instructions to identify a wheel imbalance of one of the wheels 155 when a difference between the wheel vibration of the wheel 155 and the baseline wheel vibration value of the wheel 155 exceeds the wheel vibration threshold. Specifically, the computer 105 includes instructions to take the difference between the wheel vibration data for each wheel 155 and the baseline wheel vibration value of each wheel 155, respectively and to compare that difference to the wheel vibration threshold. Since the computer 105 does this for each wheel 155, the computer 105 isolates the determination of a force imbalance to each wheel 155 and thus can identify which wheel 155 is imbalanced and may need service.

The computer 105 can determine if the force imbalance persists. The force imbalance "persists" when the force imbalance continues beyond at least one of a time threshold and a distance threshold. The time threshold and the distance threshold can be determined based on empirical testing of tire wear for different times, distances, and forces applied to the wheel 155 from the force imbalance. Upon detecting the force imbalance, the computer 105 can start a timer and/or an odometer and can measure a time elapsed and/or a distance elapsed from detection of the imbalance. Based on the elapsed time and/or distance, the computer 105 can determine whether the force imbalance persists.

The computer 105 can identify a wheel force imbalance fault when the force imbalance persists. When the force imbalance does not persist, the computer 105 can determine not to identify the wheel force imbalance fault. Upon identifying the wheel force imbalance fault, the computer 105 can send a notification over the network 125 to a vehicle 101 operator and/or the server 130 and/or a computer at a repair location, the notification indicating the specific wheel 155 that is imbalanced and requires repair.

Figure 6:
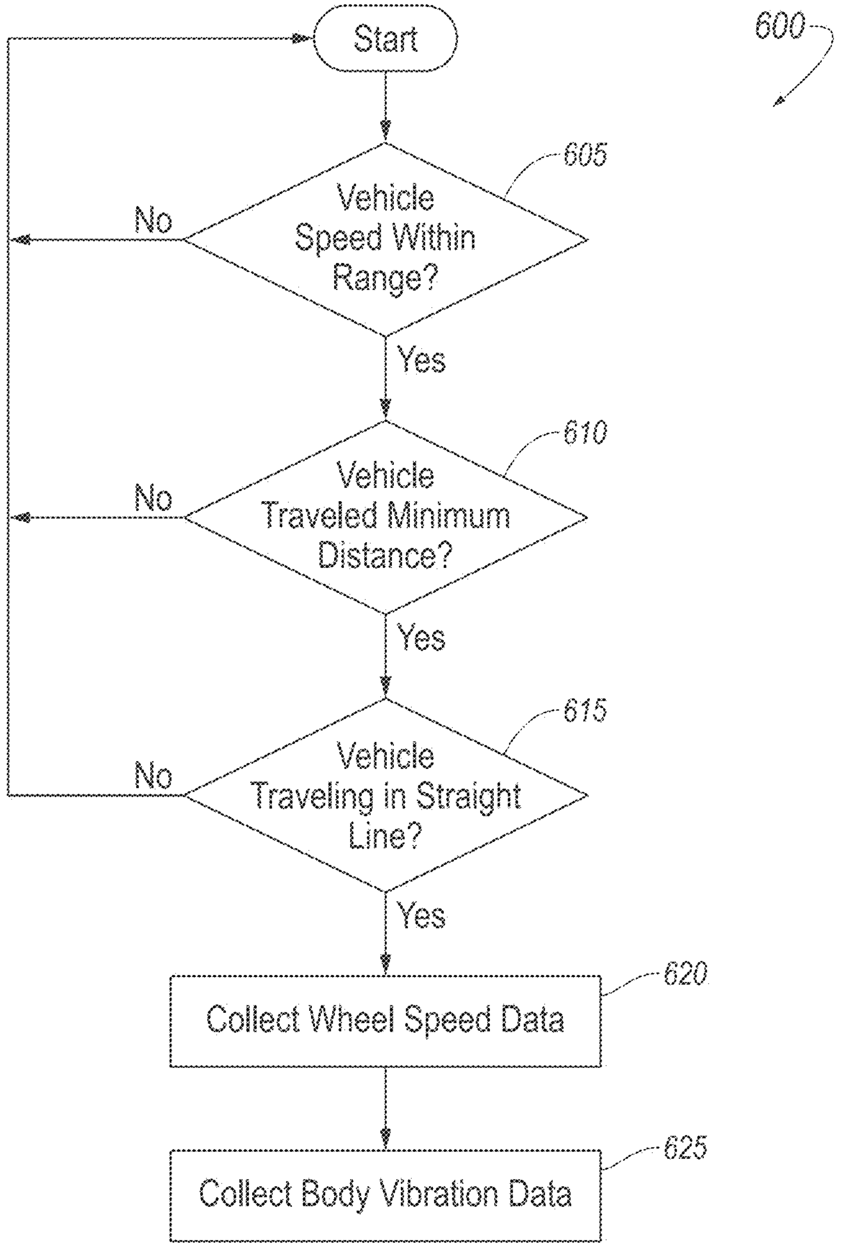
FIG. 6 is an example method.
Figure 7:
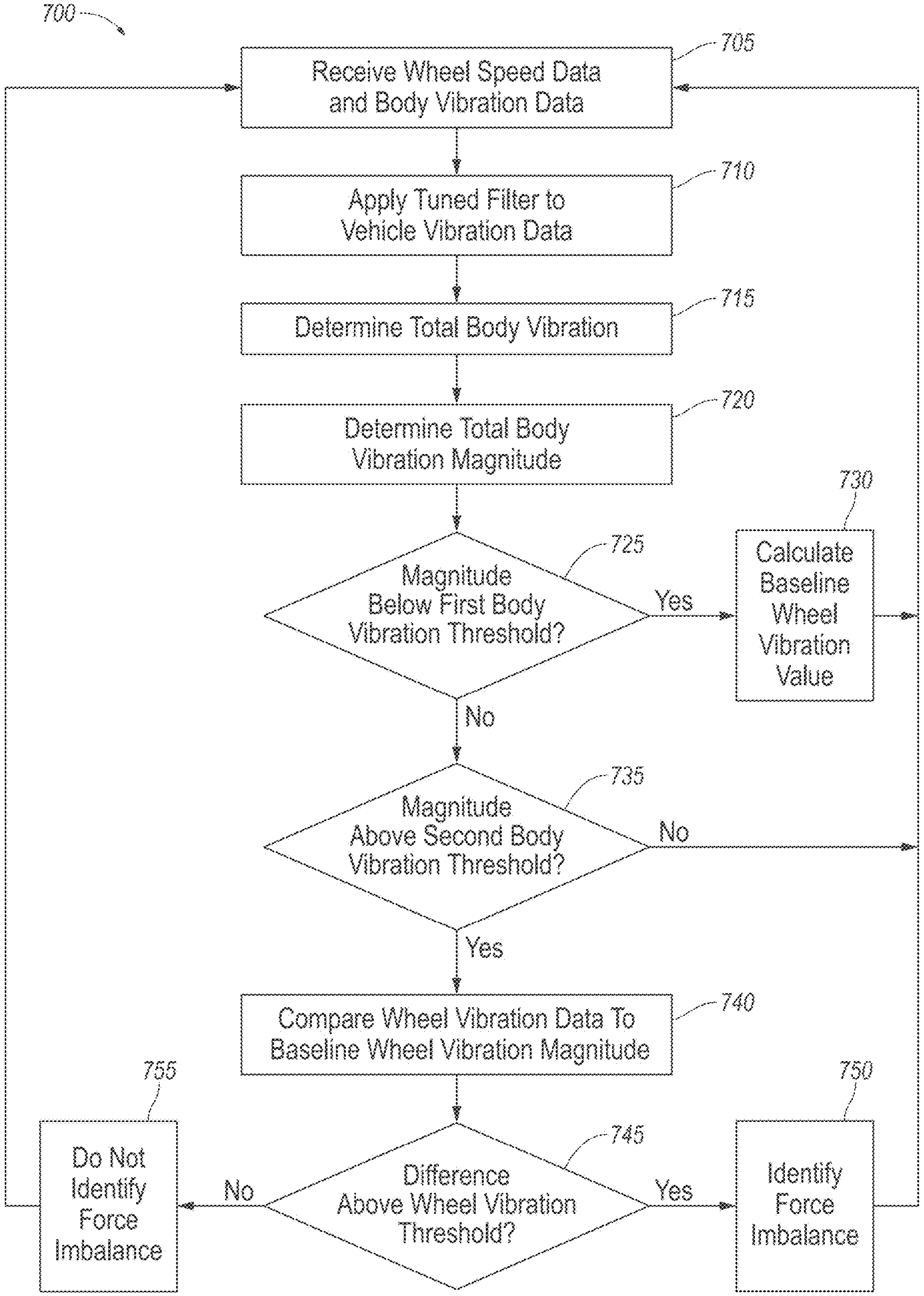
FIG. 7 is an example method.

Methods 600 and 700 performed by the computer 105 are shown in FIGS. 6 and 7, respectively. The methods 600 and 700 may form one method and are split into method 600 and 700 at least for the purpose of illustration in Figures.

The method 600 includes determining the initialization conditions described above. In decision block 605, the method 600 determines whether the vehicle 101 is traveling within a predetermined speed range. As set forth above, the predetermined speed range may be a range of speeds of the vehicle 101 at which the suspension system of the vehicle 101 is most excitable by first order vibrations. In an example, the predetermined speed range may be between 65-75 mph. In decision block 610, the method 600 determines whether the vehicle 101 has traveled a minimum distance. In decision block 615, the method 600 determines whether the vehicle 101 is traveling in a straight line. If each of these conditions is met, the method 600 continues to data collection.

In block 620, the method 600 includes collecting wheel speed data. The wheel speed data is collected by the wheel speed sensor 160 for each wheel 155 over time, as described above. The method 600 includes calculating wheel vibration data for each wheel 155 of the vehicle 101 over time based on the wheel speed data. Block 620 may include receiving wheel speed measurements from the wheel speed sensors 160 and determining the wheel vibration data for each wheel 155 from the wheel speed detected by the speed sensors 160, as described above. Specifically, the method 600 includes applying the first tuned filter to the wheel speed data, as described above.

In block 625, the method 600 includes collecting body vibration over time. The body vibration data may be body acceleration data collected by the inertia sensor 145. The method 600 includes receiving body acceleration data from the inertia sensor 145 indicating the acceleration of the vehicle body 165 in three axes (e.g., vehicle lateral axis, vehicle longitudinal axis, and vertical axis as identified in FIG. 2) over time.

Method 700 is shown in FIG. 7. Block 705 includes inputs generated in blocks 620 and 625 discussed above. It should be appreciated that methods 600 and 700, in combination, are one method and are split into two Figures for illustrative purposes. In other words, block 620 may be directly connected to block 710.

In blocks 710-720, the method 700 includes detecting body vibration of the vehicle body 165 over time. Based on collected body vibration data in block 625, e.g., body acceleration data from the inertia sensor 145, the method 700 includes determining total body vibration data and then the total body vibration magnitude.

In block 710, the method 700 includes applying the second tuned filter to the vehicle vibration data. The method 700 includes applying the second tuned filter to the detected body vibration to identify the first order vibration of the vehicle body 165. The method 700 includes detecting acceleration of the vehicle body 165 and determining a first order vibration of the vehicle body 165 based on the detected acceleration. Specifically, the method 700 detecting acceleration of the vehicle body 165 in three axes, e.g., with the inertia sensor 145, and applying the second tuned filter to the detected acceleration in three axes to identify the acceleration measurements of the vehicle body 165 in three axes, as described above. By applying the second tuned filter to the detected body vibration, the method 700 filters at least one of road noise and vibrations from road variation. The method 700 includes tuning the second tuned filter based on detected wheel speed of the vehicle wheels 155. Specifically, as set forth above, an input to the transfer function for the second tuned filter is the speed of the vehicle 101.

In block 715, the method 700 includes determining total body vibration data. As set forth above, the body acceleration data is measured in three axes. The method 700 includes generating filtered data, i.e., filtered by the second tuned filter, for each of the three axes. The method 700 includes determining the total body vibration data by calculating the root-mean-square of the acceleration measurements of the vehicle body 165 in the three axes. In other words, the method 700 includes calculating the total body vibration data by taking the square root of the sum of the lateral acceleration squared, the longitudinal acceleration squared, and the vertical acceleration squared. The root-mean-square of the acceleration measurements of the vehicle body 165 is the total body vibration data.

In block 720, the method 700 includes determining the total body vibration magnitude. The method 700 includes identifying a plurality of peaks in the detected acceleration of the vehicle body 165 to identify the total body vibration magnitude. The computer 105 may apply a peak-to-peak analysis to generate the total body vibration magnitude. One example of the total body vibration magnitude over time is shown in FIG. 3C, and three examples of the total body vibration magnitude over time is shown in FIG. 4.

In blocks 725 and 735, the method 700 includes determining whether vibration of the vehicle body 165 is above a threshold, e.g., a noise/vibration/harshness specification that indicates the occupant of the vehicle can feel the vibration of the vehicle body 165. If the vibration of the vehicle body 165 is relatively low, the method 700 includes baselining wheel vibration of each wheel 155, and if vibration of the vehicle body 165 is relatively high, the method 700 includes identifying which wheel 165 is inputting the vibration to the vehicle body 165.

In block 725, the method 700 includes, in response to detection of body vibration under the first body vibration threshold, calculating a baseline wheel vibration value for each wheel 155 based on the calculated wheel vibration for each wheel 155, respectively. Specifically, the method 700 includes comparing the total body vibration magnitude with the first body vibration threshold. As shown in block 730, if the total body vibration magnitude is below the first body vibration threshold, the method 700 includes calculating the baseline wheel vibration value for each wheel 155 based on the wheel vibration data for each wheel 155 during that time. In a situation in which the total body vibration magnitude is below the first body vibration threshold for a period of time, the method 700 includes continued modification of the baseline wheel vibration value over that period of time based on the wheel vibration data during that period of time, as shown in the feedback from block 730 to block 705. As an example, the method 700 includes calculation of a rolling average of the baseline wheel vibration values over predetermined lengths of time during which the total body vibration magnitude is below the first body vibration threshold.

In blocks 735 and 740, the method 700 includes, in response to detection of body vibration above the second body vibration threshold, comparing the calculated wheel vibration for each wheel 155 with the baseline wheel vibration value of each wheel 155, respectively. The method 700 includes, in response to detection of body vibration above the second body vibration threshold, comparing the calculated wheel vibration for each wheel 155 with the baseline wheel vibration value of each wheel 155, respectively. As shown in block 745, the method 700 includes identifying a wheel imbalance in one of the wheels 155 when a difference between the wheel vibration of the vehicle wheel 155 and the baseline wheel vibration value of the vehicle wheel 155 exceeds the wheel vibration threshold. Specifically, the method 700 includes taking the difference between the wheel vibration data for each wheel 155 and the baseline wheel vibration value of each wheel 155, respectively and comparing that difference to the wheel vibration threshold. Since the method 700 does this for each wheel 155, the method 700 isolates the determination of a force imbalance to each wheel 155 and thus can identify which wheel 155 is imbalanced and may need service.

As shown in blocks 745, 750, and 755, the method 700 can include determining whether the force imbalance persists, as described above. The method 700 includes identifying a wheel force imbalance fault when the force imbalance persists. When the force imbalance does not persist, the method 700 does not identify the wheel force imbalance fault. Upon identifying the wheel force imbalance fault, the method 700 includes sending a notification over the network 125 to a vehicle operator and/or the server 130 and/or a computer at a repair location, the notification indicating the specific wheel 155 that is imbalanced and requires repair.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising a computer including a processor and memory, the memory storing instructions executable by the processor to:

detect body vibration of a vehicle body of a vehicle over time;

calculate wheel vibration of each wheel of the vehicle over time;

in response to detection of body vibration under a first body vibration threshold, calculate a baseline wheel vibration value for each wheel based on the calculated wheel vibration for each wheel, respectively;

in response to detection of body vibration above a second body vibration threshold, compare the calculated wheel vibration for each wheel with the baseline wheel vibration value of each wheel, respectively; and identify a wheel imbalance in one of the wheels when a difference between the wheel vibration of the wheel and the baseline wheel vibration value of the wheel exceeds a wheel vibration threshold.

2. The system as set forth in claim 1, wherein the instructions to detect body vibration include instructions to detect acceleration of the vehicle body and to determine a first order vibration of the vehicle body based on the detected acceleration.

3. The system as set forth in claim 2, wherein the instructions include instructions to apply a tuned filter to the detected body vibration to identify the first order vibration of the vehicle body.

4. The system as set forth in claim 3, wherein the instructions include instructions to tune the filter based on detected wheel speed of the wheels.

5. The system as set forth in claim 1, wherein the instructions to detect body vibration include instructions to identify a plurality of peaks in the detected acceleration of the vehicle body.

6. The system as set forth in claim 1, wherein the instructions include instructions to apply a tuned filter to the detected body vibration to filter at least one of road noise and vibrations from road variation.

7. The system as set forth in claim 1, wherein the instructions to detect body vibration include instructions to determine the total vibration by calculating the root-mean-square of acceleration measurements of the vehicle body in three axes.

8. The system as set forth in claim 7, wherein the instructions include instructions to detect acceleration of the vehicle body in three axes and apply a tuned filter to the detected acceleration in three axes to identify the acceleration measurements of the vehicle body in three axes.

9. The system as set forth in claim 1, wherein the second body vibration threshold is empirically calculated.

10. The system as set forth in claim 1, wherein the instructions to detect vibration of the body of the vehicle include instructions to determine that the vehicle is traveling within a predetermined speed range.

11. A method comprising:

detecting body vibration of a vehicle body of a vehicle over time;

calculating wheel vibration of each wheel of the vehicle over time;

in response to detection of body vibration under a first body vibration threshold, calculating a baseline wheel vibration value for each wheel based on the calculated wheel vibration for each wheel, respectively;

in response to detection of body vibration above a second body vibration threshold, comparing the calculated wheel vibration for each wheel with the baseline wheel vibration value of each wheel, respectively; and identifying a wheel imbalance in one of the wheels in response to calculation of a difference between the wheel vibration of the wheel and the baseline wheel vibration value of the wheel exceeding a wheel vibration threshold.

12. The method as set forth in claim 11, wherein detecting body vibration includes detecting acceleration of the vehicle body and determining a first order vibration of the vehicle body based on the detected acceleration.

13. The method as set forth in claim 12, further comprising applying a tuned filter to the detected body vibration to identify the first order vibration of the vehicle body.

14. The method as set forth in claim 13, further comprising tuning the filter based on detected wheel speed of the wheels.

15. The method as set forth in claim 11, wherein detecting body vibration includes identifying a plurality of peaks in the detected acceleration of the vehicle body.

16. The method as set forth in claim 11, further comprising applying a tuned filter to the detected body vibration to filter at least one of road noise and vibrations from road variation.

17. The method as set forth in claim 11, wherein detecting body vibration includes determining the total vibration by calculating the root-mean-square of acceleration measurements of the vehicle body in three axes.

18. The method as set forth in claim 17, further comprising detecting acceleration of the vehicle body in three axes and applying a tuned filter to the detected acceleration in three axes to identify the acceleration measurements of the vehicle body in three axes.

19. The method as set forth in claim 11, wherein detecting vibration of the body of the vehicle includes determining that the vehicle is traveling within a predetermined speed range.

* * * * *